(12) United States Patent
Lamb et al.

(10) Patent No.: US 7,303,322 B2
(45) Date of Patent: Dec. 4, 2007

(54) MULTIPLE LIGHTGUIDE BACKLIGHT

(75) Inventors: David J. Lamb, Oakdale, MN (US); Keith M. Kotchick, Saint Paul, MN (US); Mark E. Gardiner, Santa Rosa, CA (US); Kenneth A. Epstein, Saint Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 270 days.

(21) Appl. No.: 10/744,569

(22) Filed: Dec. 23, 2003

(65) Prior Publication Data
US 2005/0135115 A1 Jun. 23, 2005

(51) Int. Cl.
*F21V 7/04* (2006.01)

(52) U.S. Cl. .......................... 362/600; 362/26; 362/27; 362/19; 362/330

(58) Field of Classification Search .................. 362/31, 362/26, 27, 19, 330, 339, 600; 349/62–65, 349/96; 385/146; 345/102
See application file for complete search history.

(56) References Cited

U.S. PATENT DOCUMENTS

| | | | |
|---|---|---|---|
| 5,359,691 A | 10/1994 | Tai | |
| 5,387,921 A * | 2/1995 | Zhang et al. | 345/102 |
| 5,587,816 A | 12/1996 | Gunjima | |
| 5,899,552 A | 5/1999 | Yokoyama | |
| 5,921,670 A | 7/1999 | Schumacher | |
| 5,956,107 A * | 9/1999 | Hashimoto et al. | 349/64 |
| 6,014,192 A | 1/2000 | Lehureau | |
| 6,024,462 A | 2/2000 | Whitehead | |
| 6,025,897 A * | 2/2000 | Weber et al. | 349/96 |
| 6,079,844 A | 6/2000 | Whitehead | |
| 6,147,725 A | 11/2000 | Yuuki | |
| 6,243,068 B1 | 6/2001 | Evanicky | |
| 6,290,364 B1 * | 9/2001 | Koike et al. | 362/620 |
| 6,443,585 B1 | 9/2002 | Saccomanno | |
| 6,448,955 B1 * | 9/2002 | Evanicky et al. | 345/102 |

(Continued)

FOREIGN PATENT DOCUMENTS

WO    WO 00/05620 A1    2/2000

(Continued)

OTHER PUBLICATIONS

U.S. Appl. No. 10/744,661, filed Dec. 23, 2003, Lamb.

(Continued)

*Primary Examiner*—Sandra O'Shea
*Assistant Examiner*—Mark Tsidulko

(57) ABSTRACT

The present disclosure is directed to backlighting systems, which include first and second lightguides, at least one light source optically connected to an edge of the first lightguide and at least one light source optically connected to an edge of the second lightguide for supplying light into their respective interiors. In the appropriate exemplary embodiments, the backlighting systems of the present disclosure include an extractor disposed at a surface of the second lightguide for diffuse extraction of light from the interior of the second lightguide. In such exemplary embodiments, at least a portion of the light supplied into the interior of the second lightguide and then diffusely extracted therefrom enters the interior of the first lightguide through a substantially optically clear surface. In some exemplary embodiments, the backlighting systems of the present disclosure include recycling enhancement structures, which may be attached to the first lightguide.

24 Claims, 14 Drawing Sheets

U.S. PATENT DOCUMENTS

| | | | |
|---|---|---|---|
| 6,488,955 B1 * | 9/2002 | Evanicky et al. | 345/102 |
| 6,566,689 B2 | 5/2003 | Hoelen | |
| 6,612,723 B2 | 9/2003 | Futhey | |
| 6,692,137 B2 * | 2/2004 | Blanchard | 362/241 |
| 6,778,235 B2 * | 8/2004 | Takahashi et al. | 349/65 |
| 2001/0017774 A1 | 8/2001 | Ito | |
| 2002/0067444 A1 | 6/2002 | Paolini | |
| 2002/0141194 A1 | 10/2002 | Wortman | |
| 2002/0163791 A1 | 11/2002 | Hoelen | |
| 2002/0172031 A1 | 11/2002 | Masuda | |
| 2003/0048639 A1 | 3/2003 | Boyd | |
| 2003/0063456 A1 | 4/2003 | Katahira | |
| 2003/0067436 A1 | 4/2003 | Hara | |
| 2003/0112521 A1 | 6/2003 | Gardiner | |
| 2003/0118805 A1 | 6/2003 | Kretman | |
| 2003/0184990 A1 * | 10/2003 | Lin | 362/31 |
| 2004/0223343 A1 * | 11/2004 | Chu et al. | 362/561 |
| 2005/0057913 A1 * | 3/2005 | Dennis | 362/26 |

FOREIGN PATENT DOCUMENTS

| | | |
|---|---|---|
| WO | WO 00/34710 | 6/2000 |
| WO | WO 00/70400 A1 | 11/2000 |
| WO | WO 01/71248 | 9/2001 |
| WO | WO 01/81960 | 11/2001 |
| WO | WO 01/84046 | 11/2001 |
| WO | WO 02/08663 | 1/2002 |
| WO | WO 03/029723 | 4/2003 |

OTHER PUBLICATIONS

3M Innovation: "Vikuiti Dual Brightness Enhancement Film-Matte (DBEF-M)" Internet Article, "Online! 2001" XP002315817, retrieved from the internet: URL:http://multimedia.mmm.com/mws/mediaweb retrieved on Jan. 31, 2005.

3M Innovation: "Vikuiti Thin Brightness Enhancement Film (T-BEF) 90/24" Internet Article, "Online! 2002" XP002315818 retrieved from the internet: URL:http://multimedia.mmm.com/mws/mediaweb, retrieved on Jan. 31, 2005.

* cited by examiner

MULTIPLE LIGHTGUIDE BACKLIGHT

FIELD OF THE INVENTION

The present disclosure relates to backlighting systems, which may be advantageously used with large high-performance liquid crystal displays. More specifically, the disclosure relates to backlighting systems that include multiple lightguides, and, optionally, various recycling enhancement structures.

BACKGROUND OF THE INVENTION

Liquid crystal displays (LCDs) are widely used in electronic display devices, such as computer monitors, handheld devices and televisions. Unlike cathode ray tube (CRT) displays, LCDs do not emit light and, thus, require a separate light source for viewing images formed on such displays. Ambient light illumination is sufficient for some applications, but with most large area and high performance LCDs, ambient light causes glare and is detrimental to readability. Thus, in order to improve readability, most large area and high performance LCDs include a source of light located behind the display, which is usually referred to as a "backlight."

Presently, many popular systems for backlighting LCDs include direct-lit backlights, in which multiple lamps or a single serpentine-shaped lamp are arranged behind the display in the field of view of the user, and edge-lit backlights, in which the light sources are placed along one or more edges of a lightguide located behind the display, so that the light sources are out of the field of view of the user. In order to compete with CRT displays, large LCDs displays (e.g., greater than ~20" or 50 cm in diagonal) must have high luminance targets, e.g., about 500 nt or more. Such high luminance targets are currently met by direct-lit backlights for LCDs.

The use of conventional direct-lit backlights systems, however, has caused some concerns among manufacturers of large LCDs, such as LCD televisions. One concern is a discrepancy between the intended lifetimes of LCDs, which for most LCD television purchasers may be 10 to 20 years, and the lifetimes of individual lamps in the televisions' backlights, which are approximately 10,000 to 20,000 hours and usually at the lower end of this range. In particular, cold cathode fluorescent lamps (CCFLs), which are frequently used for backlighting, have varying lifetimes and aging characteristics. If one CCFL burns out in a conventional direct-lit backlight, the result will be a dark line directly across the display. In addition, the spatial color uniformity of a conventional direct-lit display suffers as each CCFL ages differently. Major LCD manufacturers and television set makers currently do not have a model for servicing LCD backlights that fail in either of these two modes.

Furthermore, light reaching the viewer from multiple sources in a conventional direct-lit backlight usually is not mixed as well as the light in edge-lit backlights. Nonetheless, despite this shortcoming as well as the uniformity and aging disadvantages of conventional direct-lit backlights, they are currently a popular choice for backlighting LCDs, e.g., LCD televisions, because they allow reaching luminance targets that are competitive with CRT displays. Although edge-lit-backlights would appear to be more advantageous in many respects, achieving desired levels of luminance with traditional edge-lit backlights has remained a challenge. One difficulty has been arranging a large enough number of light sources at an edge of a single lightguide to provide sufficient optical power to reach the target luminance. Other difficulties include enhancement film warping in traditional backlights, e.g., due to high thermal gradients and handling problems.

Thus, there remains a need in the field of backlights for large high-performance LCDs for backlighting systems that are capable of achieving high luminance targets and are more efficient. In addition, there remains a need for backlighting systems for large high-performance LCDs that overcome other shortcomings of the currently available backlights described above.

SUMMARY

These and other shortcomings of the presently known backlights for large high-performance LCDs are addressed by the inventors of the present disclosure by providing multiple-lightguide backlighting systems as disclosed and claimed herein. Such systems may be advantageously used with a variety of devices, including LCD televisions, LCD monitors, point of sale devices, and other suitable devices. In addition to allowing to achieve high output luminances, the present disclosure mitigates the risks of using variable lifetime light sources, so that burnout or aging of an individual light source would not be catastrophic to the display viewing quality. Thus, if an individual light source ages or burns out in a multiple-lightguide system according to an embodiment of the present disclosure, the effect on spatial brightness and color uniformity will be relatively insignificant due to the enhanced light mixing.

The present disclosure eliminates the need for a thick diffuser plate traditionally used in direct-lit backlights to hide individual sources from the viewer, thus providing additional gains in brightness. The present disclosure also eliminates the need for a structured reflector traditionally used in direct-lit backlights, resulting in cost reductions and increased ease of manufacturing. In addition, light extracted directly from the top lightguide could be allowed to exit at a wide range of angles, which would enhance off-axis viewability of the display. Moreover, the present disclosure makes possible inclusion of additional features for preventing warp and physical damage to various recycling enhancement structures that may be used in exemplary embodiments of the present disclosure.

Thus, the present disclosure is directed to backlighting systems, which in one exemplary embodiment include first and second lightguides, at least one light source optically connected to an edge of the first lightguide and at least one light source optically connected to an edge of the second lightguide for supplying light into their respective interiors. In some embodiments, the backlighting systems of the present disclosure include an extractor disposed at a surface of the second lightguide for diffuse extraction of light from the interior of the second lightguide. In such exemplary embodiments, at least a portion of the light supplied into the interior of the second lightguide and then diffusely extracted therefrom enters the interior of the first lightguide through a substantially optically clear surface.

Such backlighting systems may further include a first recycling enhancement structure disposed at a surface of the first lightguide, which may include a reflective polarizer, a reflective polarizer and a diffuser, or a reflective polarizer and a prismatic structure. The diffuser may be spatially graded. Preferably, the first recycling enhancement structure is attached to a surface of the first lightguide. Alternatively or additionally, the backlighting systems of the present disclosure may include a second recycling enhancement structure disposed between the first lightguide and the second lightguide, which may include a prismatic structure. Preferably, the second recycling enhancement structure is attached to a surface of the first lightguide.

Other embodiments of the backlighting systems of the present disclosure include first and second lightguides, at least one light source optically connected to an edge of the first lightguide and at least one light source optically connected to an edge of the second lightguide for supplying light into their respective interiors. Such exemplary embodiments also include a second recycling enhancement structure disposed between the first lightguide and the second lightguide.

The second recycling enhancement structure may include a prismatic structure. The prismatic structure preferably includes a plurality of prisms having apexes pointing generally away from the second lightguide. In the appropriate embodiments, the second recycling enhancement structure may include a first surface defining a plurality of prisms substantially symmetrical about a first horizontal axis and having apexes pointing generally away from the second lightguide and a second surface defining a plurality of prisms substantially symmetrical about a second horizontal axis and having apexes pointing generally away from the second lightguide. The first axis may be generally orthogonal to the second axis. Preferably, the second recycling enhancement structure is attached to a surface of the first lightguide.

The backlighting systems constructed according to the present disclosure may also include a first recycling enhancement structure disposed at a surface of the first lightguide. The first recycling enhancement structure may include a reflective polarizer, a reflective polarizer and a diffuser, or a reflective polarizer and a prismatic structure. Preferably, the first enhancement structure is attached to a surface of the first lightguide.

In the appropriate exemplary embodiments of the present disclosure, the first and second lightguides each comprise two opposing edges, at least one light source is optically connected to each of said edges, and the opposing edges of the first lightguide are not aligned with the opposing edges of the second lightguide. Alternatively, the first and second lightguides each comprise two adjacent edges, at least one light source is optically connected to each of said edges, and the adjacent edges of the first lightguide are not aligned with the adjacent edges of the second lightguide.

The present disclosure is also directed to backlighting systems, which include first and second lightguides, a plurality of light sources optically connected to a first edge of the first lightguide, a plurality of light sources optically connected to a second edge of the first lightguide, a plurality of light sources optically connected to a first edge of the second lightguide, and a plurality of light sources optically connected to a second edge of the second lightguide. In some embodiments, the backlighting systems of the present disclosure include an extractor disposed at a surface of the second lightguide for diffuse extraction of light from the interior of the second lightguide. In such exemplary embodiments, at least a portion of the light supplied into the interior of the second lightguide and then diffusely extracted therefrom enters the interior of the first lightguide through a substantially optically clear surface. Such backlighting systems may further include a first recycling enhancement structure disposed at a surface of the first lightguide, which may include a reflective polarizer, a reflective polarizer and a diffuser, or a reflective polarizer and a prismatic structure.

The diffuser may be spatially graded. Preferably, the first recycling enhancement structure is attached to a surface of the first lightguide.

Alternatively or additionally, these exemplary embodiments may include a second recycling enhancement structure disposed between the first lightguide and the second lightguide. The second recycling enhancement structure may include a prismatic structure. The prismatic structure preferably includes a surface defining a plurality of prisms having apexes pointing generally away from the second lightguide. In the appropriate embodiments, the second recycling enhancement structure may include a first surface defining a plurality of prisms substantially symmetrical about a first horizontal axis and having apexes pointing generally away from the second lightguide and a second surface defining a plurality of prisms substantially symmetrical about a second horizontal axis and having apexes pointing generally away from the second lightguide. The first axis may be generally orthogonal to the second axis. Preferably, the second recycling enhancement structure is attached to a surface of the first lightguide.

Furthermore, in the appropriate embodiments of the present disclosure, at least one of the first lightguide and the second lightguide may have variable thickness, and at least one lightguide may include first and second wedge portions. The extractor disposed at a surface of the second lightguide may be spatially graded. Additionally or alternatively, substantially optically clear surface extraction structures may be disposed on the surface of the first lightguide that faces the second lightguide. The backlighting systems of the present disclosure may also include a reflector sheet disposed next to the surface of the second lightguide that faces away from the first lightguide and a diffuser sheet disposed next to the surface of the second lightguide that faces away from the first lightguide.

These and other aspects of the backlighting systems of the subject invention will become more readily apparent to those having ordinary skill in the art from the following detailed description together with the drawings.

BRIEF DESCRIPTION OF THE DRAWINGS

So that those having ordinary skill in the art to which the subject invention pertains will more readily understand how to make and use the subject invention, exemplary embodiments thereof will be described in detail below with reference to the drawings, wherein.

DETAILED DESCRIPTION

Figure 1:
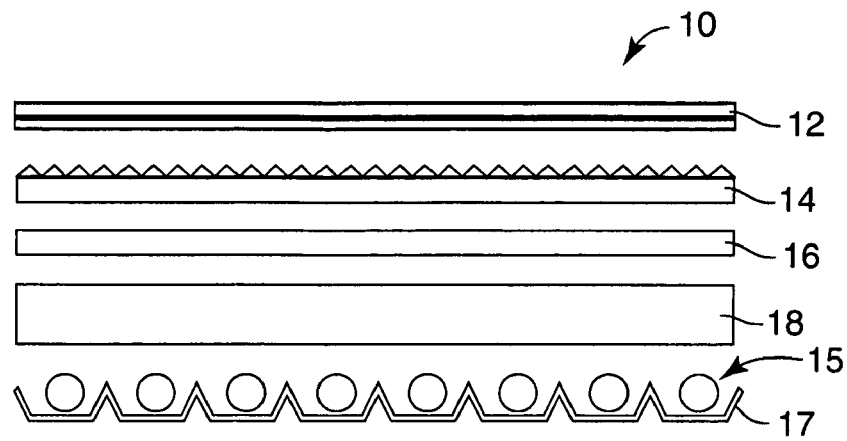
FIG. 1 is a schematic cross-sectional view of a presently available direct-lit backlight for LCD televisions.

FIG. 1 illustrates the structure and components of a traditional direct-lit backlight 10, such as those presently used in LCD televisions. The traditional backlight 10 includes an array of light bulbs 15, typically CCFLs, and a shaped reflector 17 located behind the array of light bulbs 15 for directing more light toward a viewer. A thick diffuse plate 18 is usually placed over the array of light bulbs 15 to diffuse light from the individual bulbs, e.g., CCFLs, in order to hide them from the viewer. A typical diffuser plate 18 has a large amount of absorption associated with it, as well as a large amount of back scattering, the effects of which grow exponentially if light-recycling enhancement films (described below) are added to the backlight. To further aid in hiding individual light bulbs from the viewer, diffuser plates have been patterned, which resulted in additional losses of light.

The traditional backlight 10 further includes a thin diffuser sheet 16 and a layer of enhancement film 14 having prismatic surface structures, such as Vikuiti™ Brightness Enhancement Film BEF, available from 3M Company. The enhancement film 14 refracts light within a certain angle toward the viewer. Light outside that angle is "recycled," i.e., reflected back into the backlight 10, where it travels within the system until reaching the proper angle for exiting the system. In addition, the traditional backlight 10 includes a layer of reflective polarizer 12 placed over the enhancement film 14. The reflective polarizer 12 is usually a multilayer reflective polarizer, such as Vikuiti™ Dual Brightness Enhancement Film (DBEF), also available from 3M Company. The reflective polarizer 12 transmits light with a predetermined polarization, while reflecting light with a different polarization into the backlight 10 where the polarization state is altered and the light is fed back to the reflective polarizer 12. This process is also referred to as "recycling."

Figure 2:
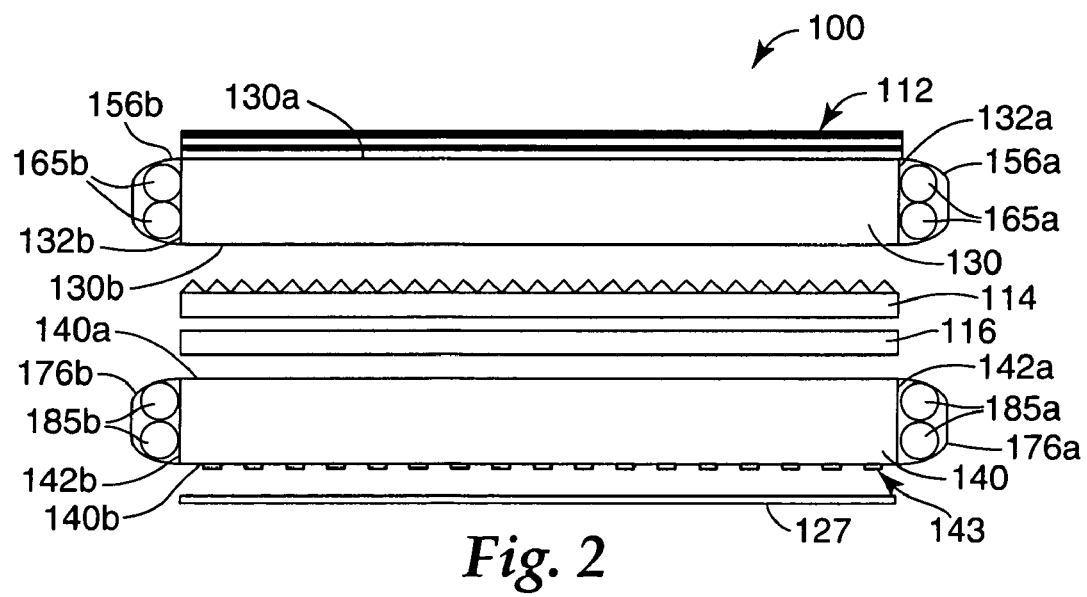
FIG. 2 is a schematic cross-sectional view of an exemplary embodiment of a backlighting system according to the present disclosure.

FIG. 2 shows a schematic cross-sectional view of a backlighting system 100 constructed according to an exemplary embodiment of the present disclosure. The backlighting system 100 includes a first lightguide 130 and a second lightguide 140. In the exemplary embodiment shown in FIG. 2, pairs of light sources 165a and 165b are placed at the edges 132a and 132b of the first lightguide 130, so that at least a portion of the light emanating from the sources 165a, 165b is coupled into the interior of the lightguide 130 and propagates along its length by reflecting from the surfaces 130a and 130b, e.g., by total internal reflection. Lamp cavity reflectors 156a, 156b may be provided as illustrated in FIG. 2, for increasing coupling efficiency from the sources 165a, 165b into the interior of the lightguide 130. As will be understood by those of ordinary skill in the art, shape and structure of the reflectors 156a, 156b may vary.

Referring further to FIG. 2, in the exemplary backlighting system 100, pairs of light sources 185a and 185b are placed at the edges 142a and 142b of the second lightguide 140, so that at least a portion of the light emanating from the sources 185a, 185b is coupled into the interior of the lightguide 140 and propagates along its length by reflecting from the surfaces 140a and 140b, e.g., by total internal reflection. Lamp cavity reflectors 176a, 176b, similar to the lamp cavity reflectors 156a and 156b, may be provided as illustrated in FIG. 2 for increasing coupling efficiency from the sources 185a, 185b into the interior of the lightguide 140. As will be understood by those of ordinary skill in the art, shape and structure of the reflectors 176a, 176b may also vary.

Figure 2A:
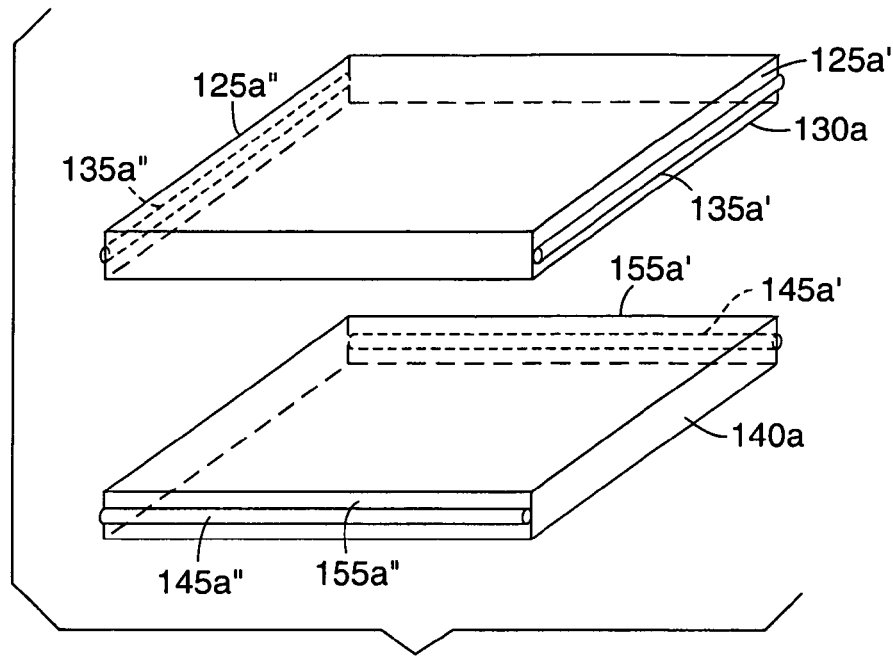
FIGS. 2A and 2B illustrate alternative ways of arranging light sources at the edges of generally rectangular lightguides.
Figure 2B:
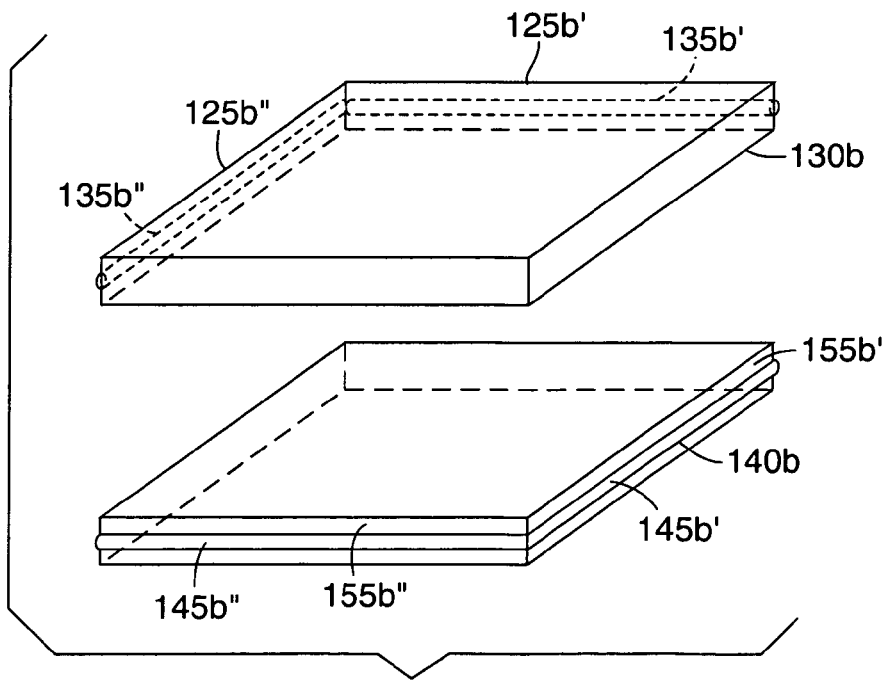

Although the exemplary backlighting system 100 illustrated in FIG. 2 shows pairs of light sources 165a, 165b placed at the edges 132a, 132b of the lightguide 130 and pairs of light sources 185a, 185b placed at the edges 142a, 142b of the lightguide 140, the present disclosure also contemplates using one, three or more light sources at an edge of the lightguide 130 and one, three or more light sources at one or more edges of the lightguide 140. In addition, although for ease of illustration light sources 165a and 165b are shown to be aligned with the light sources 185a and 185b, the present disclosure contemplates placing light sources at any one or more edges of each lightguide, as desired for a specific application. For example, FIGS. 2A and 2B, illustrate two exemplary ways of arranging light sources 135a', 135a", 145a', 145a" and 135b', 135b", 145b', 145b" at the edges of generally rectangular lightguides 130a, 140a and 130b, 140b respectively. In FIG. 2A, light sources 135a'and 135a" are disposed at the opposing edges 125a' and 125a" of the lightguide 130a and light sources 145a' and 145a" are disposed at the opposing edges 155a' and 155a" of the lightguide 140a. In this exemplary embodiment, each of the opposing edges 125a' and 125a" is not aligned with any of the opposing edges 155a' and 155a'. In FIG. 2B, light sources 135b' and 135b" are disposed at the adjacent edges 125b' and 125b" of the lightguide 130b and light sources 145b' and 145b' are disposed at the adjacent edges 155b' and 155b" of the lightguide 140b. In this exemplary embodiment, each of the adjacent edges 125b' and 125b" is not aligned with any of the adjacent edges 155b' and 155b".

Light sources suitable for use with embodiments of the present disclosure include any source that emits light, such as a fluorescent lamp (e.g., CCFL), a hot cathode fluorescent lamp (HCFL), an incandescent lamp, an electroluminescent light source, a phosphorescent light source, an external electrode fluorescent lamp, a light emitting diode (LED), including organic LEDs (OLEDs), an array of LEDs, any other suitable light source(s), or any appropriate number or combination thereof.

The number and type of lightguides may also vary. For example, three or more lightguides may be used in accordance with the present disclosure and any one or more of the constituent lightguides may be hollow. Increasing the number of lightguides in backlighting systems according to exemplary embodiments of the present disclosure would lead to corresponding increases in weights and thicknesses of displays. However, most manufacturers of large panel LCDs typically consider display thickness and weight to be secondary concerns. Lifetime, brightness, spatial uniformity, ease of assembly, and reduction in warp of enhancement films are usually considered to be more important.

The number and type of light sources arranged at an edge of a lightguide, e.g., 130 or 140, as well as the number, dimensions and type of lightguides will depend on the specific application and luminance target, as well as practical considerations such as the size of the specific source as compared to the dimensions of the lightguide. For example, assuming that lightguides 130 and 140 have about the same thicknesses as those typically seen in traditional single-lightguide edge-lit displays, up to six bulbs of typical CCFLs may be used per lightguide (e.g., three bulbs at each of the edges 132a, 132b, 142a, and 142b). Thus, a 29" direct-lit LCD television backlight having 12 light bulbs can be replaced with a two-lightguide system illustrated in FIG. 2, with three bulbs arranged at each lightguide edge (e.g., 132a, 132b, 142a and 142b). A 32" direct-lit LCD television with 16 light bulbs would require a three-lightguide system to make it completely edge-lit in order to produce comparable luminance.

Referring further to FIG. 2, the backlighting system 100 may include a first recycling enhancement structure 112 disposed at a surface of the first lightguide 130. In the context of the present disclosure, "a recycling enhancement structure" may be any structure that is capable of "recycling" light in a manner similar or equivalent to the enhancement films 12 and 14, described with reference to FIG. 1. Preferably, the first recycling enhancement structure 112 is disposed at the surface 130a and includes a reflective polarizer, such as a multilayer reflective polarizer Vikuiti™ Dual Brightness Enhancement Film (DBEF), available from 3M Company. Most preferably, the first recycling enhancement structure 112 also includes a diffuser, which may be integrated within the reflective polarizer or be included as a separate component, such as a matte surface or a layer of pressure sensitive adhesive (PSA). One function of the diffuser is the randomization of the polarization and direction of the light reflected by the reflective polarizer back into the backlighting system 100. Exemplary components suitable for use within the first recycling enhancement structure 112 include Vikuiti™ Diffuse Reflective Polarizer Film (DRPF) and Vikuiti™ Dual Brightness Enhancement Film-Matte (DBEF-M), both available from 3M Company.

The first recycling enhancement structure 112 preferably is attached to a surface of the first lightguide 130, e.g., surface 130a. The first recycling enhancement structure 112 may be attached to a surface of the first lightguide 130 by lamination, molding the enhancement structure 112 or any of its constituent components into the lightguide or by any suitable bonding technique. If the first recycling enhancement structure 112 includes a matte surface, e.g., as in DBEF-M, the first recycling enhancement structure 112 preferably is attached to the lightguide 130 so that the matte surface faces the surface 130a. In exemplary embodiments of the present disclosure, in which the first recycling enhancement structure 112 is attached to the first lightguide 130, light may be extracted from the interior of the first lightguide 130 through its interactions with the first recycling enhancement structure 112. For example, if DRPF or DBEF-M is included into the structure 112, light is diffused by either of these films and it is either transmitted to the LCD in the proper polarization state or scattered back into the backlight 100, where it can be recycled as explained above. Alternatively, DBEF may be attached to a surface of the first lightguide 130 with a layer of PSA. In that case, PSA would also facilitate the extraction of light from the interior of the first lightguide 130.

In appropriate exemplary embodiments of the present disclosure, both DBEF and DRPF may be included into the first recycling enhancement structure 112 and preferably attached, e.g., laminated, to the surface 130a of the lightguide 130. In that case, the polarization axes of both reflective polarizers, i.e., DBEF and DRPF should be aligned. As a result, DRPF will facilitate extraction of light from the lightguide 130, while DBEF will enhance the contrast. Alternatively, BEF or another suitable prismatic film or structure may be used in combination with a reflective polarizer, e.g., DBEF, as a part of the first recycling enhancement structure 112. BEF would facilitate light extraction, while DBEF would ensure that light exits the backlight 100 with the appropriate polarization.

Additionally or alternatively, the backlighting system 100 illustrated in FIG. 2 may include a second recycling enhancement structure 114, which may be disposed between the first lightguide 130 and the second lightguide 140. Preferably, the second recycling enhancement structure 114 includes prismatic structures, e.g., prismatic structured film, that would aid in redirecting and recycling light to increase on-axis brightness of the backlight 100 by refracting toward the viewer light within a certain angle and reflecting back light outside that angle. One example of such prismatic structured films suitable for use within the second recycling enhancement structure 114 is Vikuiti™ Brightness Enhancement Film (BEF), available from 3M Company. The second recycling enhancement structure 114 also may include prismatic structures oriented so that the prism apexes are facing generally away from the lightguide 130.

In the appropriate exemplary embodiments of the present disclosure, two BEFs or similar prismatic films or structures may be used in the second recycling enhancement structure 114. In such exemplary embodiments, the directions of the prismatic films' grooves preferably are crossed, and a thin layer of adhesive joins the films so that only small portions of the prismatic structures are immersed into the adhesive. The second recycling enhancement structure 114 preferably is attached, e.g., laminated, molded or bonded using any other suitable technique, to the surface 130b of the lightguide 130. This feature would create added extraction from the first lightguide 130 and reduce warping of the second recycling enhancement structure 114, which may occur due to temperature variations, handling and other causes.

Placing an extractor 143, preferably a diffuse extractor, at a surface of the lightguide 140 may facilitate light extraction from the second lightguide 140. FIG. 2 illustrates the use of such an extractor 143, which in this exemplary embodiment includes an array of dots disposed on the surface 140b of the lightguide 140. Preferably, the pattern of dots is optimized to compensate for potential spatial non-uniformities of light extraction from the entire backlighting system 100. For example, the dot pattern may be adjusted so that more light is extracted toward the center of the lightguide 140 by gradually increasing the size of dots toward the center of the lightguide 140.

The backlighting system 100 may further include a diffuser sheet 116 and a reflector sheet 127. The diffuser sheet primarily serves to increase spatial uniformity of the light exiting the second lightguide 140, as well as to aid in randomizing polarization of the light reflected back into the backlight 100. The reflector sheet 127 may further increase efficiency of the backlighting system 100 by reflecting back light that escapes through the side 140b of the lightguide 140, so that the light may be directed toward the viewer and/or recycled.

Figure 3:
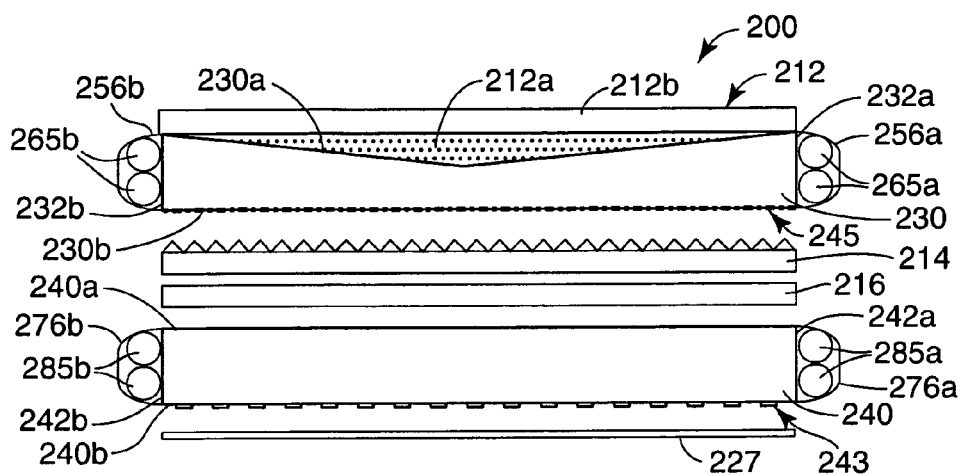
FIG. 3 is a schematic cross-sectional view of another exemplary embodiment of a backlighting system according to the present disclosure, illustrating the use of a spatially graded diffuser.

FIG. 3 is a schematic cross-sectional view of a backlighting system 200 constructed according to another exemplary embodiment of the present disclosure. The backlighting system 200 includes a first lightguide 230 and a second lightguide 240. Pairs of light sources 265a and 265b are placed at the edges 232a and 232b of the first lightguide 230, so that at least a portion of the light emanating from the sources 265a, 265b is coupled into the interior of the lightguide 230 and propagates along its length by reflecting from the surfaces 230a and 230b, e.g., by total internal reflection. Lamp cavity reflectors 256a, 256b may be provided for increasing coupling efficiency from the sources 265a, 265b into the interior of the lightguide 230. As will be understood by those of ordinary skill in the art, shape and structure of the reflectors 256a, 256b may vary.

Referring further to FIG. 3, in the exemplary backlighting system 200, pairs of light sources 285a and 285b are placed at the edges 242a and 242b of the second lightguide 240, so that at least a portion of the light emanating from the sources 285a, 285b is coupled into the interior of the lightguide 240 and propagates along its length by reflecting from its surfaces 240a and 240b, e.g., by total internal reflection. Lamp cavity reflectors 276a, 276b, similar to the lamp cavity reflectors 256a and 256b, may be provided for increasing coupling efficiency from the sources 285a, 285b into the interior of the lightguide 240. As will be understood by those of ordinary skill in the art, shape and structure of the reflectors 276a, 276b may also vary. As it has been explained in reference to the exemplary embodiments illustrated in FIG. 2, the number, type and configuration of light sources and lightguides may vary as well.

Referring further to FIG. 3, the backlighting system 200 may include a first recycling enhancement structure 212 disposed at a surface of the first lightguide 230. Preferably, the first recycling enhancement structure 212 is disposed at the surface 230a and includes a reflective polarizer 212b, such as DBEF. Most preferably, the first recycling enhancement structure further includes a diffuser 212a, such as a loaded PSA structure, which also may be used to attach the reflective polarizer to a surface, e.g., surface 230a, of the first lightguide 230. As illustrated in FIG. 3, the diffuser 212a may be spatially graded to improve the overall uniformity of the output from the backlighting system 200. The backlighting system 200 may also include optically clear surface extraction features 245, such as step-wedge structures disposed on the surface 230b, which would facilitate extraction of light from the first lightguide 230. Those of ordinary skill in the art will readily recognize that such surface extraction features 245 may be used as appropriate in other exemplary embodiments of the present disclosure.

The remainder of the backlighting system 200 may have a structure similar to that of the embodiments illustrated in FIG. 2 or a different suitable structure. For example, the backlighting system 200 may include a second recycling enhancement structure 214, which may be disposed between the first lightguide 230 and the second lightguide 240. Preferably, the second recycling enhancement structure 214 includes prismatic structures, e.g., prismatic structured film such as BEF, which redirect and recycle light to increase on-axis output brightness of the backlighting system 200 by refracting toward the viewer light within a certain angle and reflecting back light outside that angle. Similar to the backlighting system 100, the backlighting system 200 may further include a diffuser sheet 216 and a reflector sheet 227.

Light extraction from the second lightguide 240 may be accomplished by placing an extractor 243, preferably a diffuse extractor, at a surface of the lightguide 240. FIG. 3 illustrates the use of such an extractor 243, which in this exemplary embodiment includes an array of dots disposed on the surface 240b of the lightguide 240. Preferably, the pattern of dots is optimized to compensate for potential spatial non-uniformities of light extraction from the entire backlighting system 200. For example, the dot pattern may be adjusted so that more light is extracted toward the center of the lightguide 240 by gradually increasing the size of dots toward the center of the lightguide 240.

Figure 4:
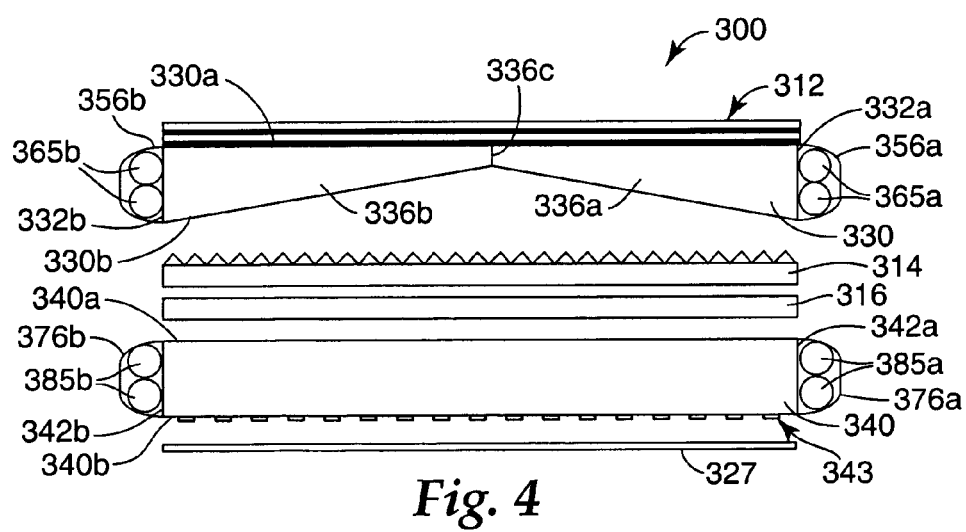
FIG. 4 is a schematic cross-sectional view of another exemplary embodiment of a backlighting system according to the present disclosure, illustrating the use of a variable thickness lightguide.

FIG. 4 illustrates a backlighting system 300 constructed according to another exemplary embodiment of the present disclosure. The backlighting system 300 includes a first lightguide 330 and a second lightguide 340. As it has been explained in reference to other exemplary embodiments, pairs of light sources 365a and 365b are placed at the edges 332a and 332b of the first lightguide 330, and pairs of light sources 385a and 385b are placed at the edges 342a and 342b of the second lightguide 240. Preferably, lamp cavity reflectors 356a, 356b and 376a, 376b are provided for increasing coupling efficiency from the sources 365a, 365b and 385a, 385b into the lightguides 330 and 340. As will be understood by those of ordinary skill in the art, shape and structure of the reflectors may vary. The number, type and configuration of light sources and the number and configuration of lightguides may vary as well.

In the exemplary backlighting system 300, the first lightguide 330 may include two wedge lightguides 336a and 336b joined at a juncture or seam 336c, or a single lightguide molded so that the surface 330a is generally flat while the surface 330b has a cross-section approximating the shape of an inverted V, with the thickness of the lightguide 330 tapering away from the light sources, as illustrated in FIG. 4. A first recycling enhancement structure 312 may be disposed at a surface of the first lightguide 330. Preferably, the first recycling enhancement structure 312 is disposed at the surface 330a and includes a reflective polarizer, such as DBEF. Most preferably, the first recycling enhancement structure 312 also includes a diffuser, which may be integrated within the reflective polarizer or be included as a separate component, such as a matte surface or a layer of PSA. Examples of structures suitable for use within the first recycling enhancement structure 312 in exemplary embodiments of the present disclosure include DRPF and DBEF-M.

The first recycling enhancement structure 312 preferably is attached to the surface 330a of the first lightguide 330, e.g., by lamination, molding the enhancement structure 312 or any of its constituent components into the lightguide or by any suitable bonding technique. Extraction of light from the first lightguide 330 in such exemplary embodiments may be achieved by total internal reflection failure and interactions with the attached first recycling enhancement structure 312.

The remainder of the backlighting system constructed according to this exemplary embodiment may have a structure similar to the embodiments illustrated in FIGS. 2 and 3, or a different suitable structure. For example, the backlighting system 300 may include a second recycling enhancement structure 314 disposed between the first lightguide 330 and the second lightguide 340. Preferably, the second recycling enhancement structure 314 includes prismatic structures, e.g., prismatic structured film such as BEF, that redirect and recycle light to increase on-axis brightness of the backlight 300 by refracting toward the viewer light within a certain angle and reflecting back light outside that angle. In the appropriate exemplary embodiments, the second recycling enhancement structure 314 may include prismatic structures having prism apexes that face generally away from the light guide 330. Similar to the backlighting system 100, the backlighting system 300 may further include a diffuser sheet 316 and a reflector sheet 327.

Light extraction from the second lightguide 340 may be accomplished by placing an extractor 343, preferably a diffuse extractor, at a surface of the lightguide 340. The extractor 343 may include an array of dots disposed on the surface 340b of the lightguide 340. Preferably, the pattern of dots is optimized to compensate for potential spatial non-uniformities of light extraction from the entire backlighting system 300. For example, if two wedge lightguides 336a and 336b are used to form the lightguide 330, extraction of light from the second lightguide 340 may be adjusted to hide the juncture or seam 336c from the viewer by a flood of light. This may be accomplished by increasing the size of dots in a dot pattern toward the center of the lightguide 340.

Figure 5:
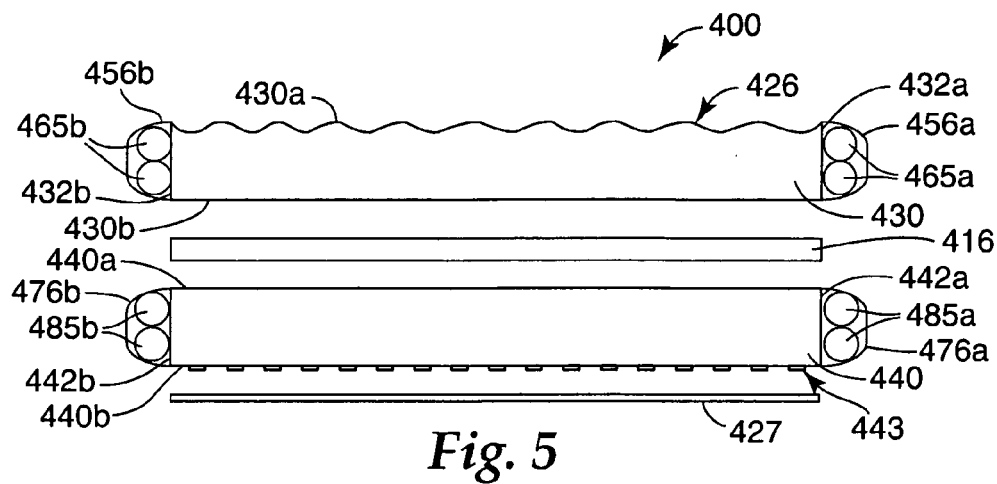
FIG. 5 is a schematic cross-sectional view of another exemplary embodiment of a backlighting system according to the present disclosure.

FIG. 5 shows a schematic cross-sectional view of a backlighting system 400 according to another exemplary embodiment of the present disclosure. The backlighting system 400 includes a first lightguide 430 and a second lightguide 440. As it has been explained in reference to other exemplary embodiments, pairs of light sources 465a and 465b are placed at the edges 432a and 432b of the first lightguide 430, and pairs of light sources 485a and 485b are placed at the edges 442a and 442b of the second lightguide 440. Lamp cavity reflectors 456a, 456b and 476a, 476b may be provided for increasing coupling efficiency from the sources 465a, 465b and 485a, 485b into the lightguides 430 and 440. As will be understood by those of ordinary skill in the art, shape and structure of the reflectors may vary. The number, type and configuration of light sources and lightguides may vary as well.

Referring further to FIG. 5, the backlighting system 400 may include a recycling enhancement structure 426 disposed at the surface 430a of the first lightguide 430. Preferably, the recycling enhancement structure 426 includes a reflective polarizer, such as DBEF, and prismatic structures, e.g., a prismatic structured film such as BEF. The prismatic structures may be introduced into the backlight 400 by appropriately molding the first lightguide 430, laminating a sheet of prismatic film onto the surface 430a, or by any other suitable technique. The reflective polarizer, e.g., DBEF, also may be attached to the lightguide 430, e.g., by lamination, molding or another suitable bonding technique, preferably over the prismatic structures. Variations may be introduced into the recycling enhancement structure 426, and particularly into the prismatic structures, to enhance extraction of light from the first lightguide 430 as well as to increase off-axis brightness. See, e.g., U.S. Pat. No. 6,354,709, the disclosure of which is incorporated by reference herein to the extent not inconsistent with the present disclosure. In the appropriate exemplary embodiments, the recycling enhancement structure may include prismatic structures having prism apexes that face generally forward the first lightguide 430.

The second lightguide 440 may include an extractor 443, preferably a diffuse extractor, disposed at a surface of the lightguide 440. As in other embodiments described herein, the extractor 443 may be disposed on the surface 440b of the lightguide 440 and may include an array of dots. Preferably, the pattern of dots is optimized to compensate for potential spatial non-uniformities of light extraction from the entire backlighting system 400. The backlighting system 400 may further include a diffuser sheet 416, which would aid in hiding the diffuse extractor 443 from the viewer and randomizing polarization of recycled light, and a reflector sheet 427.

Figure 6:
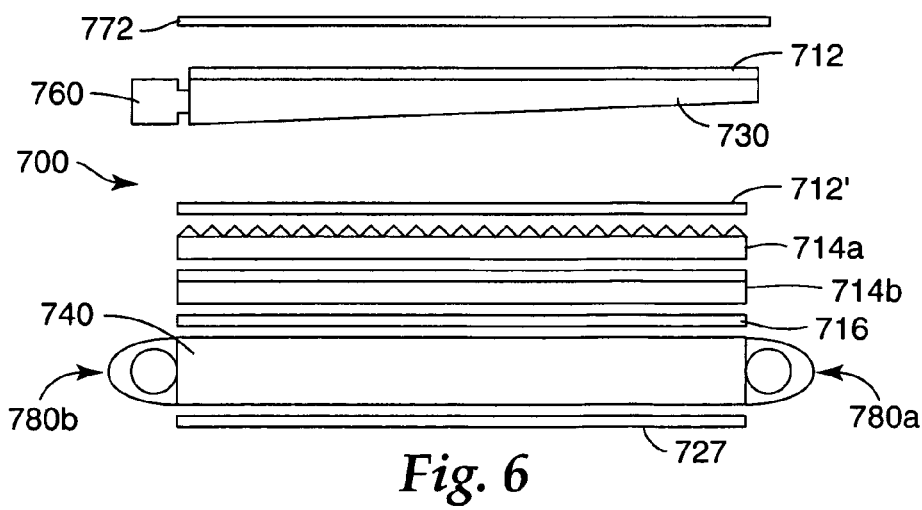
FIG. 6 is a schematic cross-sectional view of an exemplary configuration for testing some of the concepts of the present disclosure.

Series of experiments were conducted to test various aspects of exemplary embodiments of the present disclosure. FIG. 6 illustrates a testing configuration 700 for exemplary embodiments of the present disclosure. The testing configuration 700 includes a bottom lightguide 740, illuminated by two CCFL light source assemblies 780a, 780b, with a reflector 727 disposed below the lightguide 740 and a diffuser sheet 716 disposed over the lightguide 740. Crossed BEFs 714a, 714b were also included into the testing configuration 700 and positioned over the diffuser sheet 716. The top lightguide 730 in this configuration was a wedge lightguide laminated with strips of DBEF-M (diffuse side toward lightguide) and DRPF, designated as 712 and located side-by-side. The light source 760 for illuminating the top lightguide 730 was an incandescent fiber line source. An absorbing polarizer 772 was placed over the top lightguide 730 so that it could be aligned or anti-aligned with the reflective polarizer or completely removed.

Conoscopic measurements were then taken using ELDIM EZContrast160. All measurements were made at a constant distance from the fiber source to eliminate effects of down-wedge spatial non-uniformities. Performance improvements were seen despite the fact that the output luminance of the wedge lightguide 730 and fiber source 760 was more than an order of magnitude smaller than that of the bottom lightguide 740 illuminated by the CCFL source assemblies 780a and 780b.

Figure 7A:
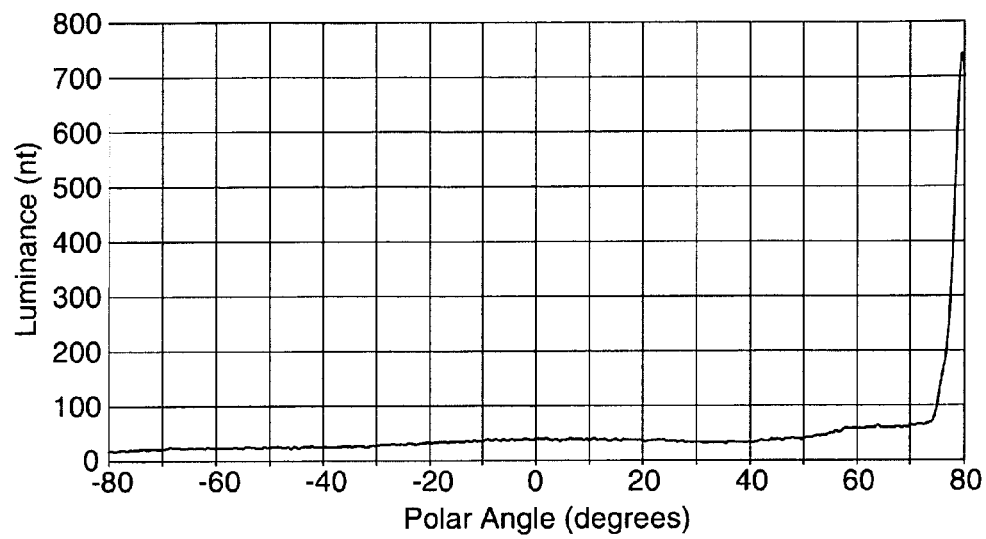
FIGS. 7A-C show data illustrating properties of light extracted from the top lightguide, where the top lightguide is a bare wedge (FIG. 7A), a wedge laminated with DBEF-M (FIG. 7B), or a wedge laminated with DRPF (FIG. 7C)
Figure 7B:
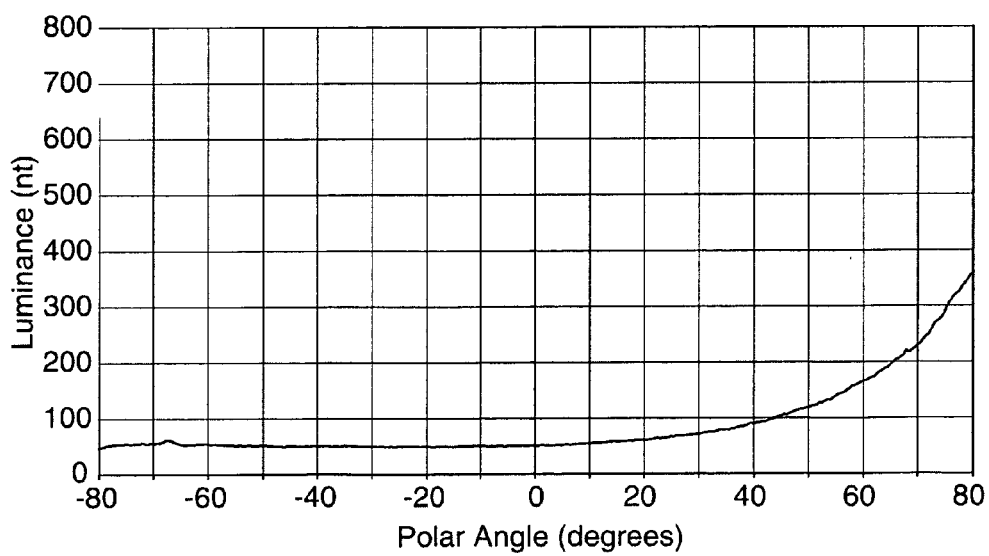
Figure 7C:
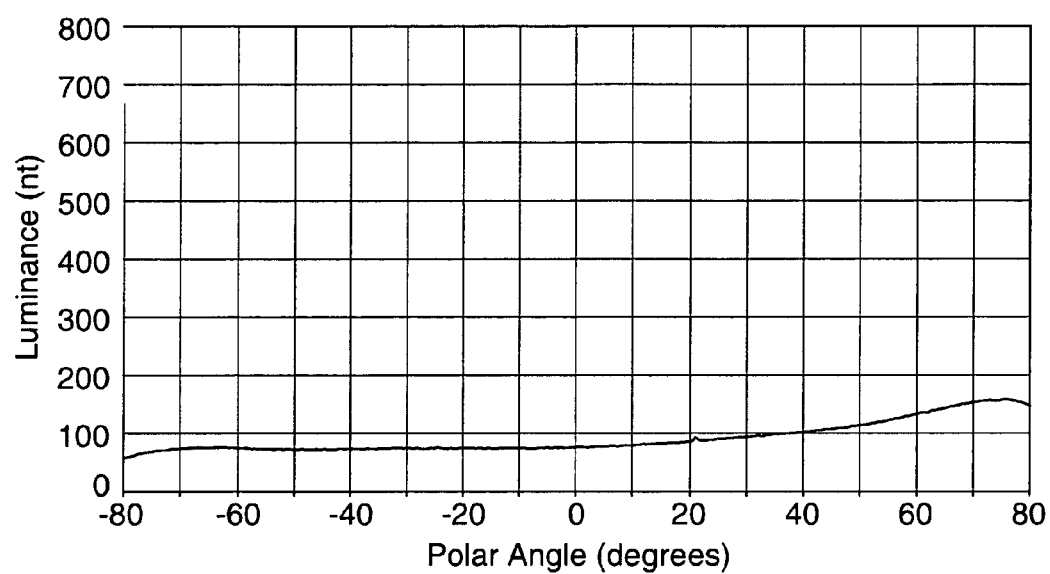
Figure 8A:
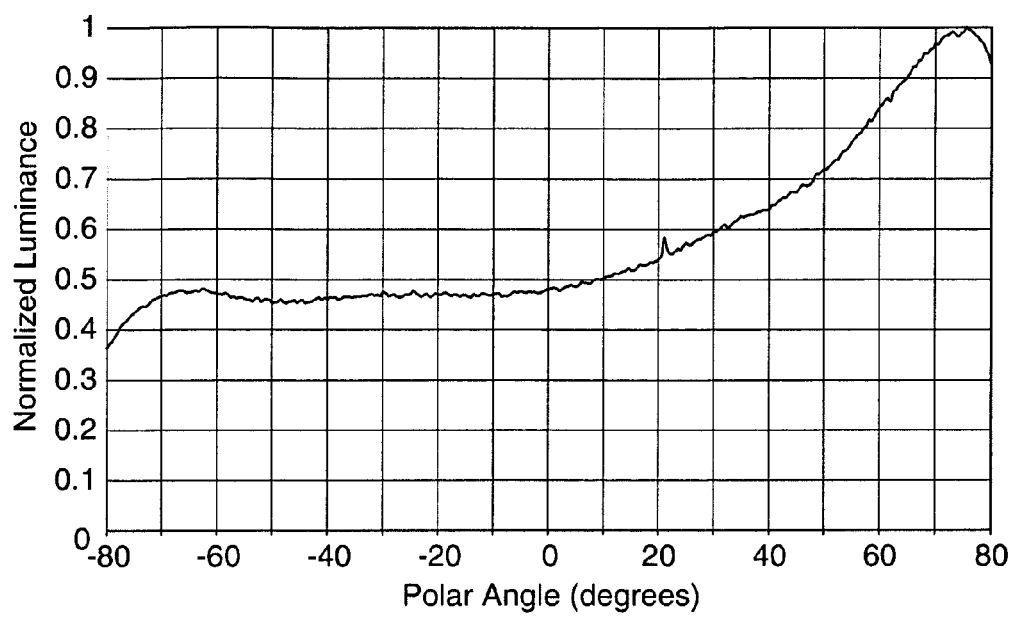
FIGS. 8A-F show data representing output polarization of DRPF-laminated lightguide.
Figure 8B:
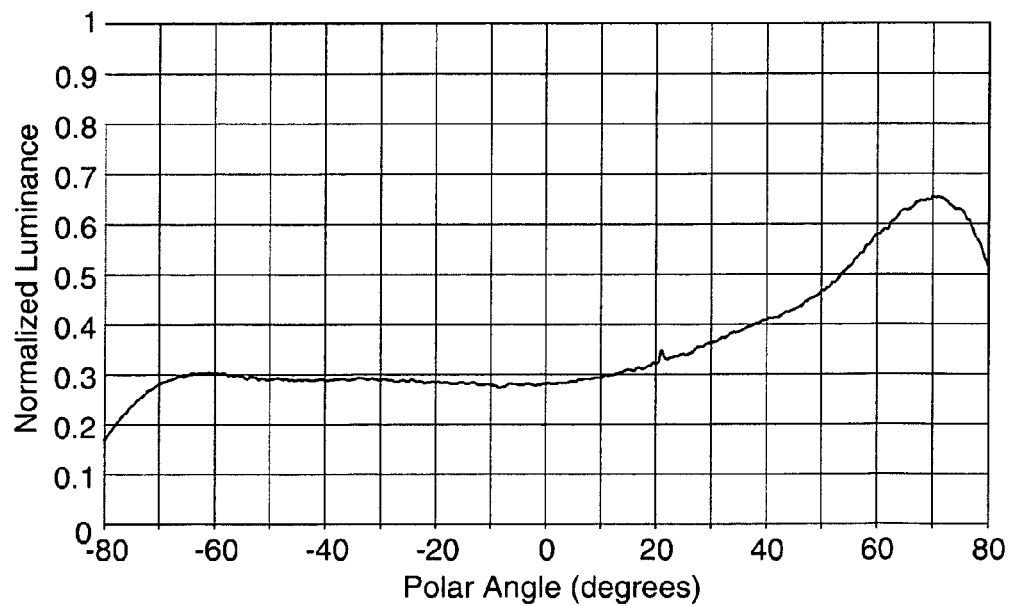
Figure 8C:
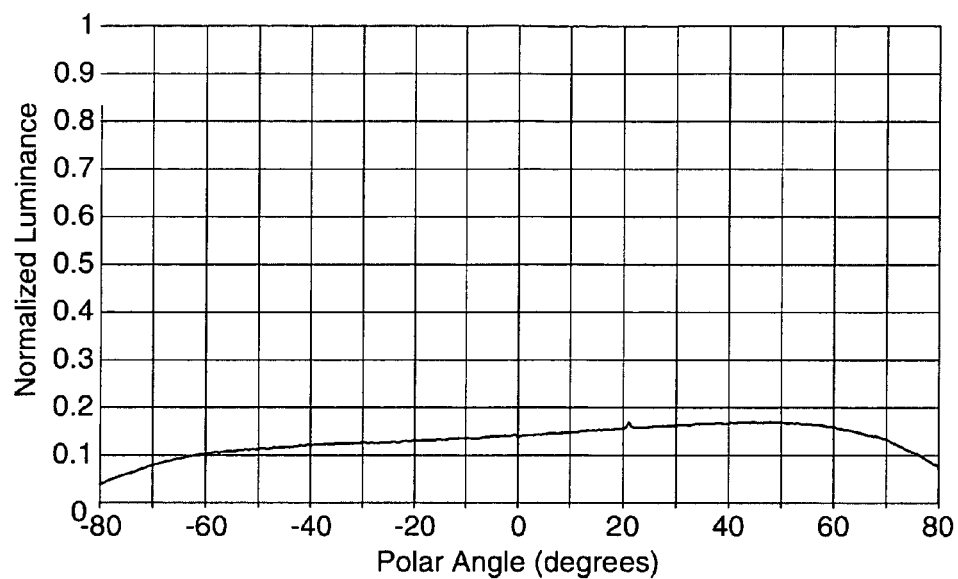
Figure 8D:
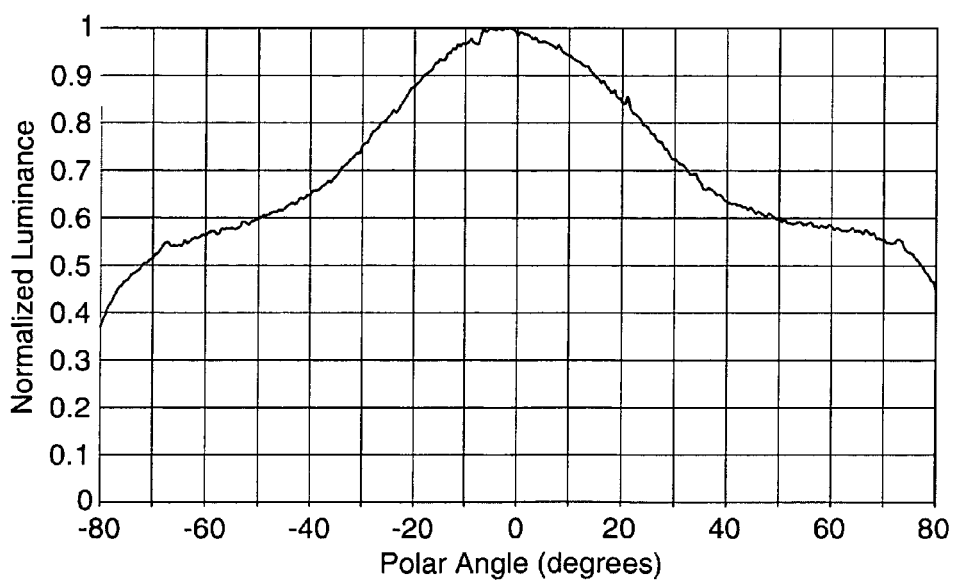
Figure 8E:
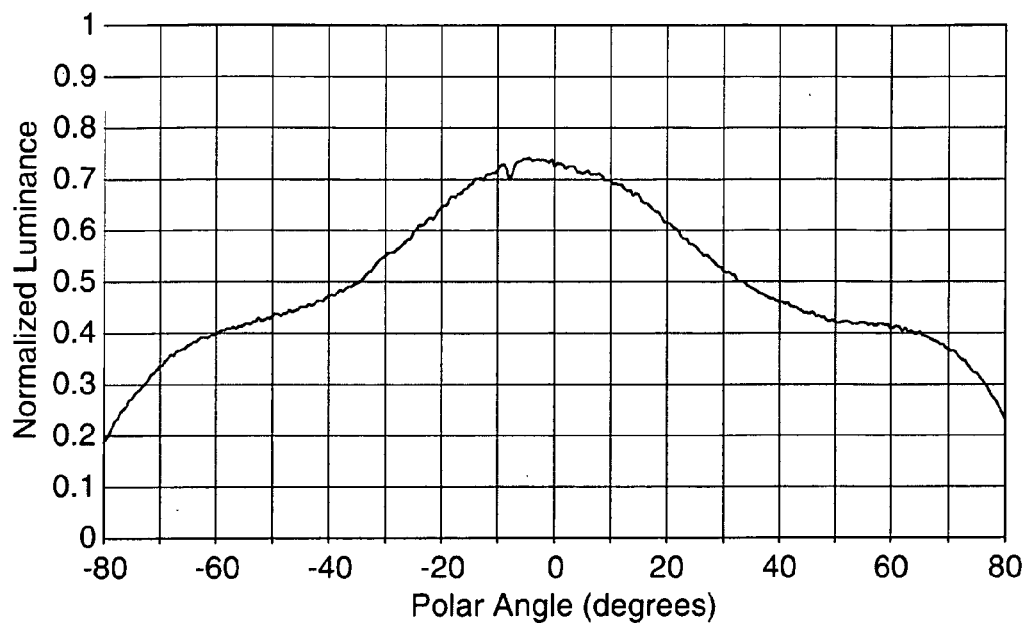
Figure 8F:
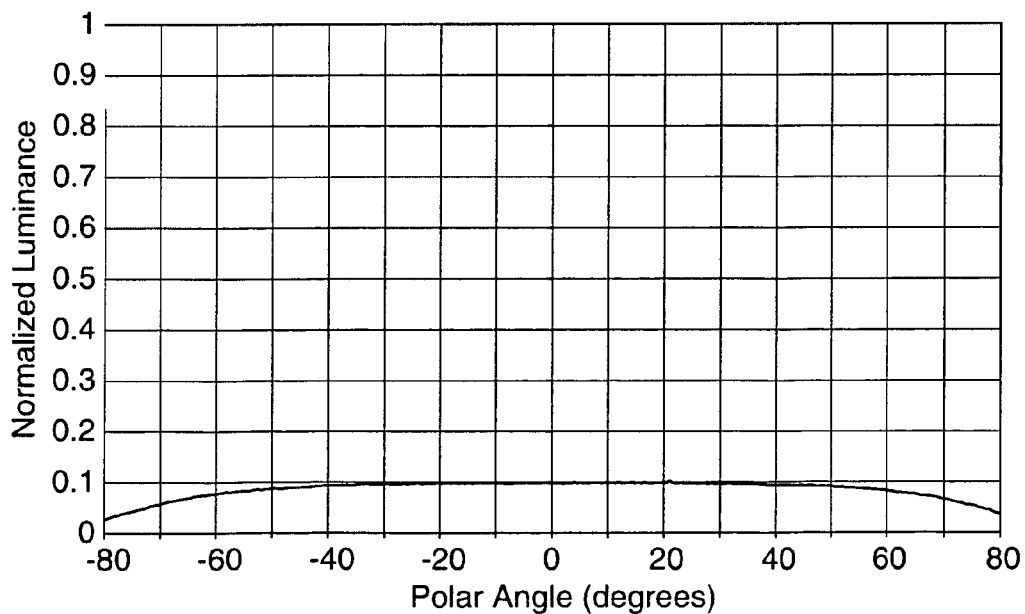
Figure 9A:
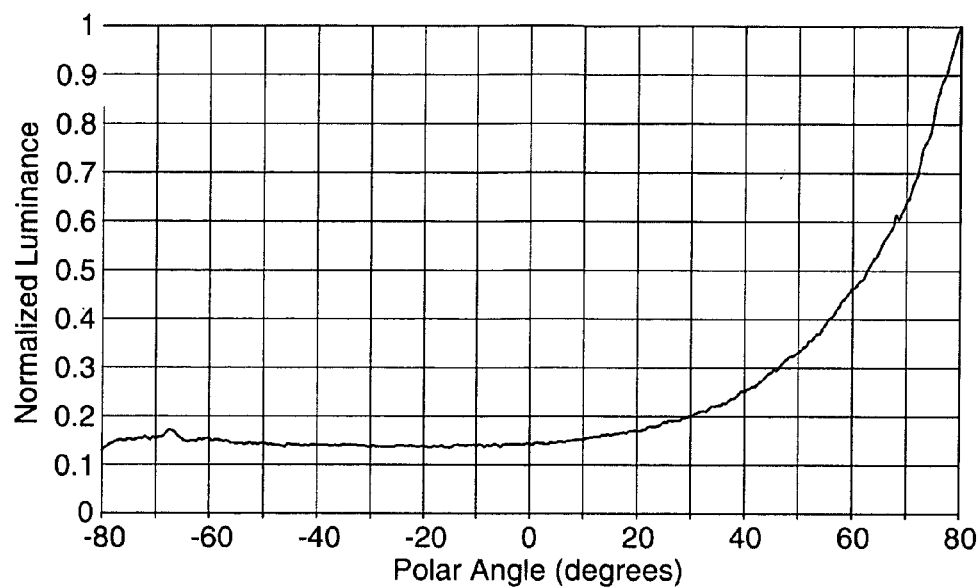
FIGS. 9A-F show data representing output polarization of DBEF-M-laminated lightguide.
Figure 9B:
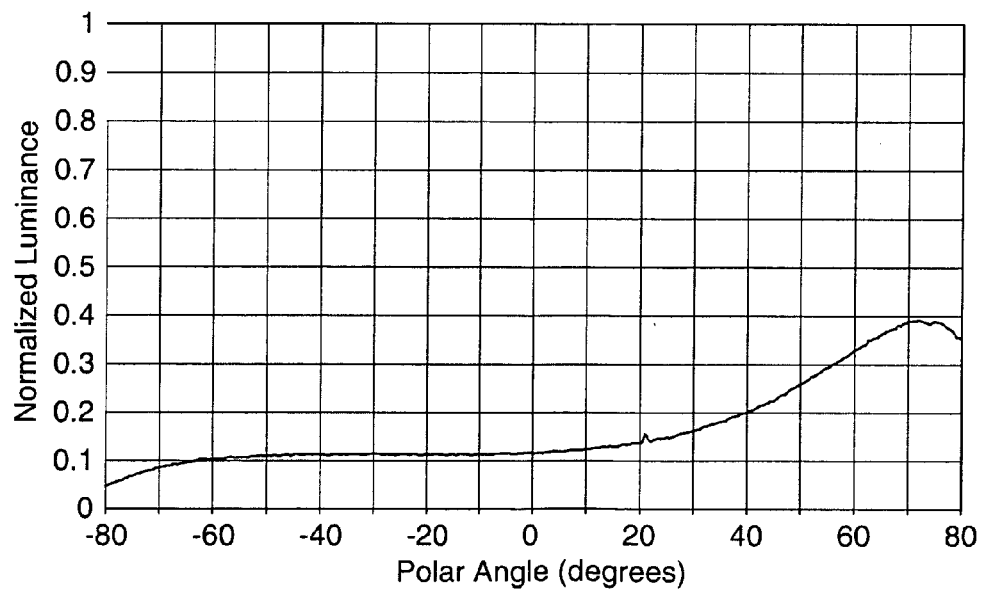
Figure 9C:
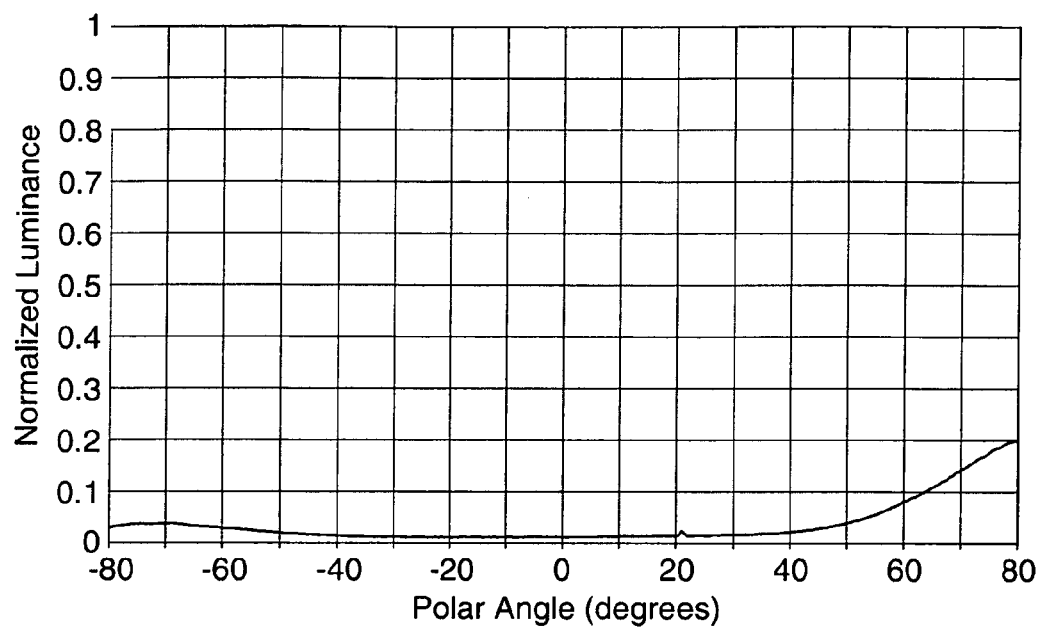
Figure 9D:
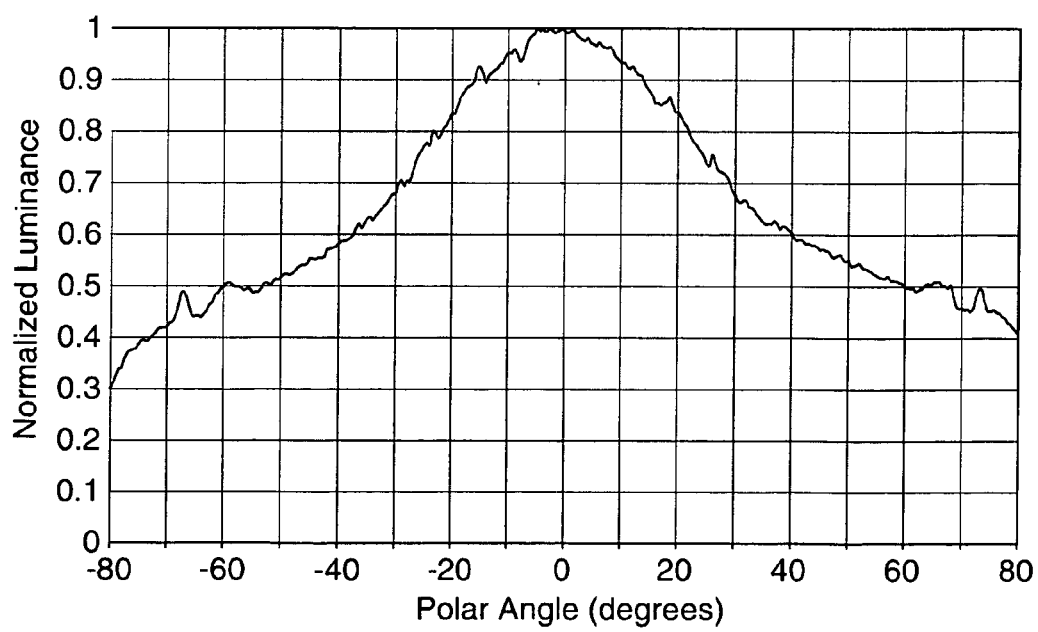
Figure 9E:
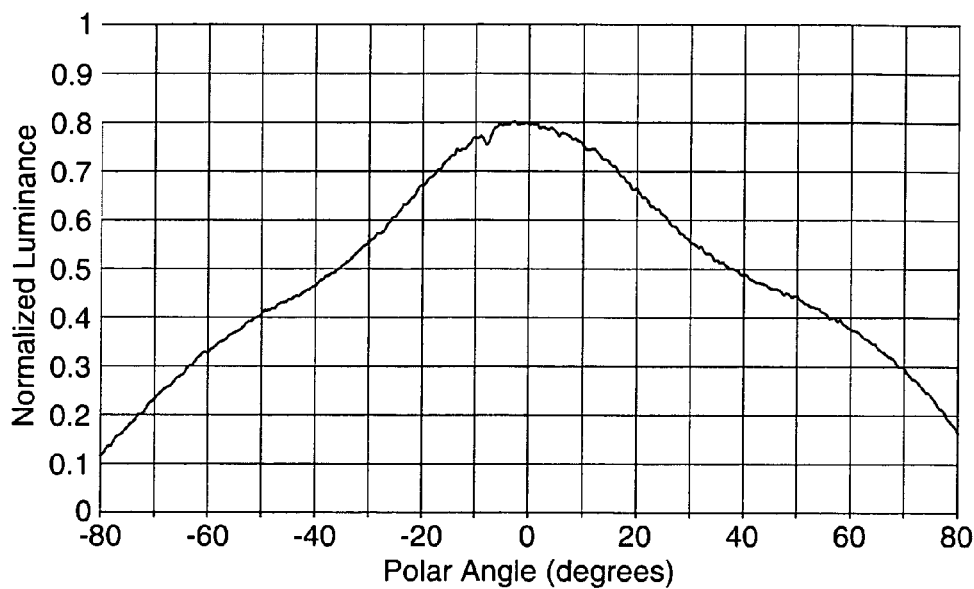
Figure 9F:
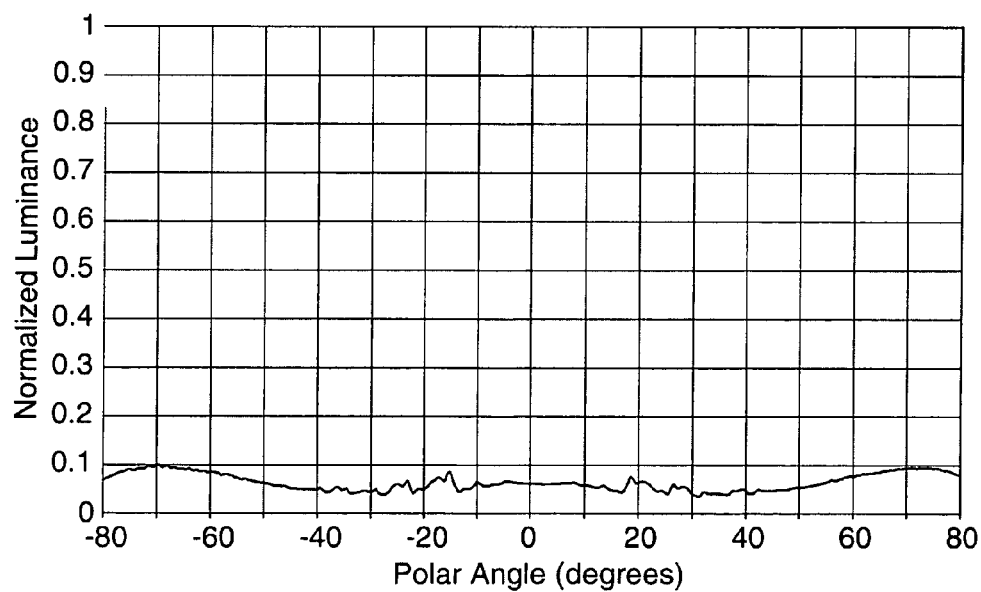
Figure 10A:
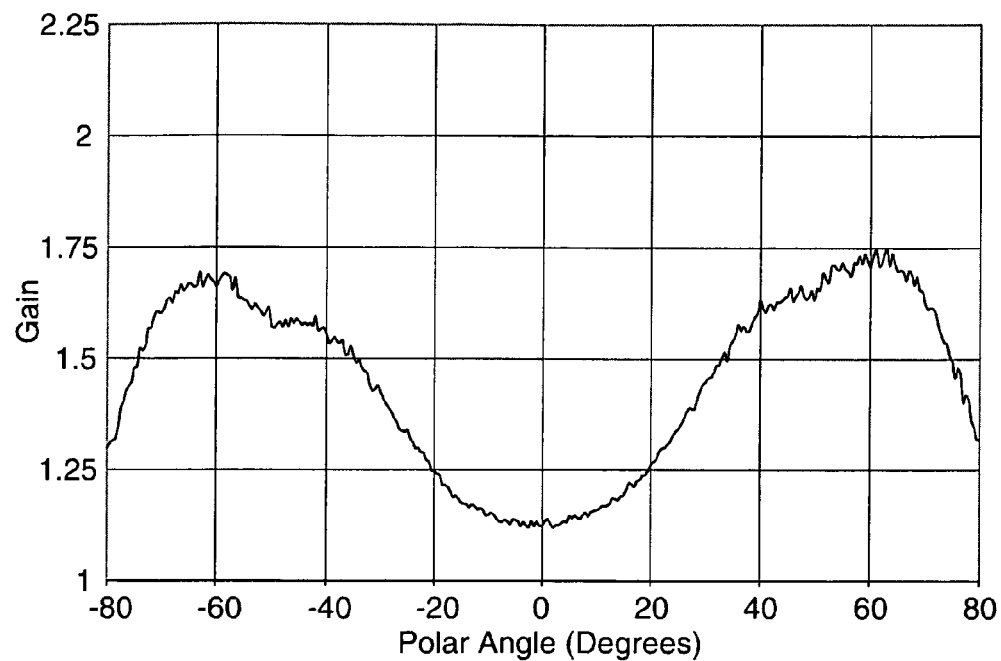
FIG. 10A shows a gain profile of a lightguide system with a loose sheet of DRPF.
Figure 10B:
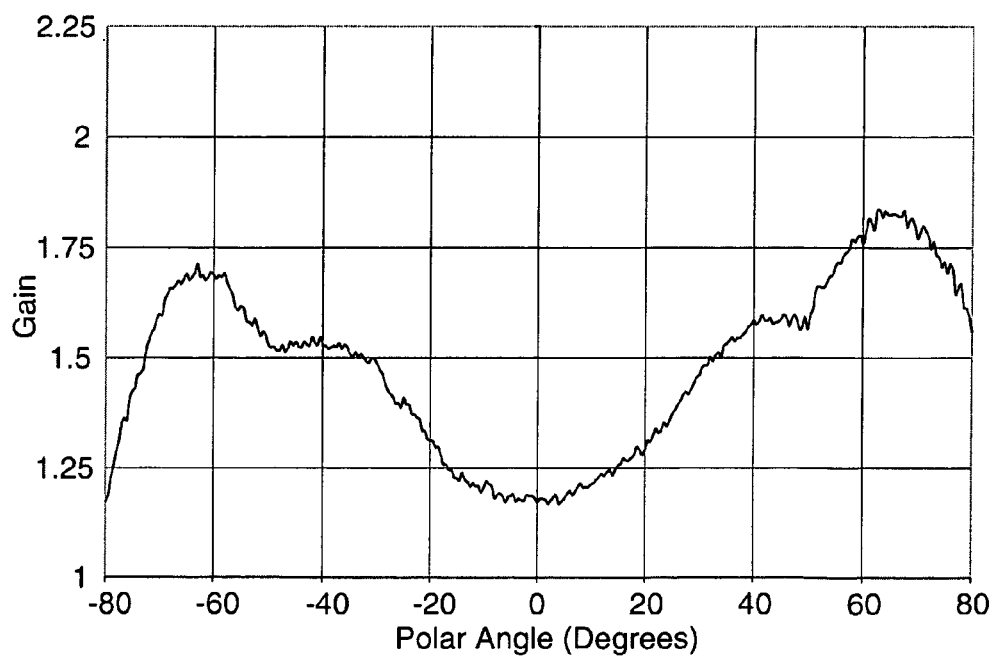
FIG. 10B shows a gain profile of a lightguide system with a laminated sheet of DRPF.
Figure 10C:
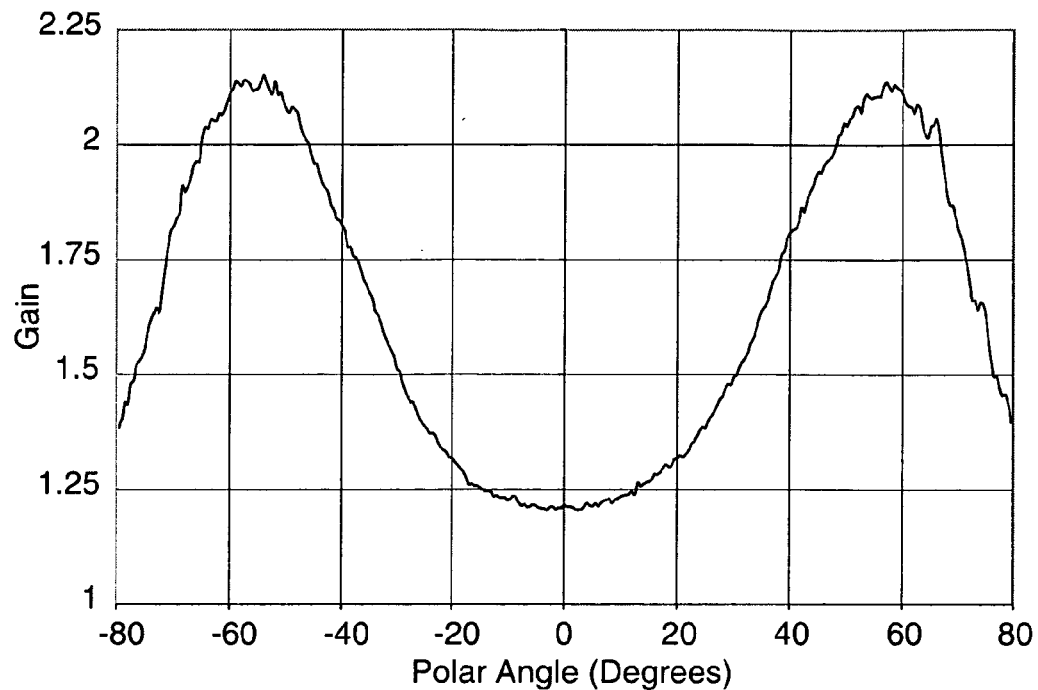
FIG. 10C shows a gain profile of a lightguide system with a loose sheet of DBEF-M.
Figure 10D:
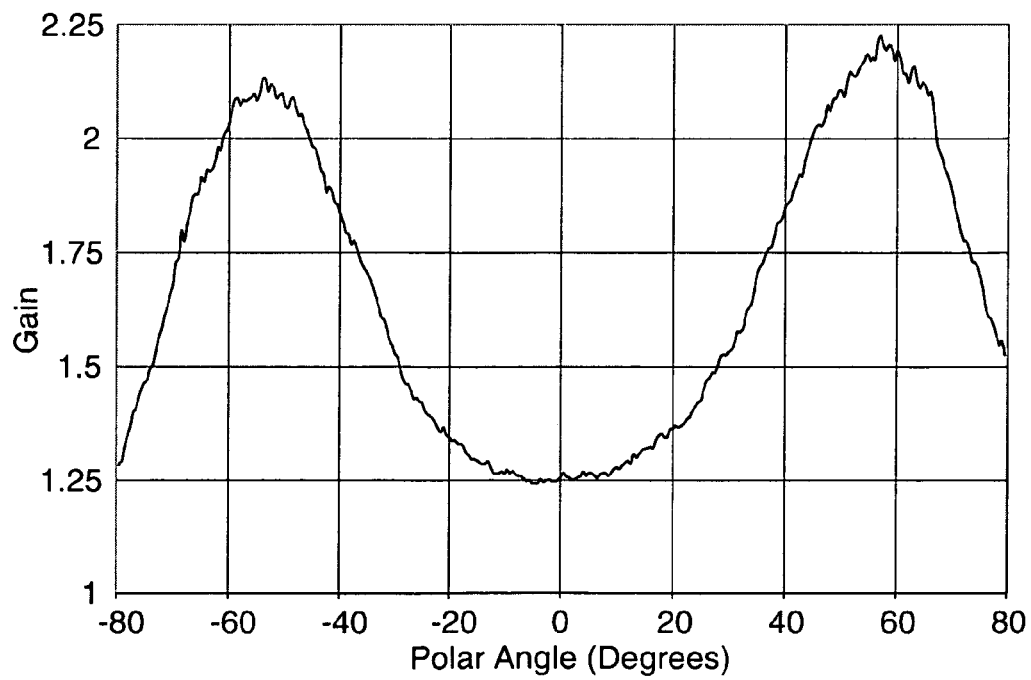
FIG. 10D shows a gain profile of a lightguide system with a laminated sheet of DBEF-M.

FIGS. 7A-7C show results of the first set of measurements, illustrating properties of light extracted from the top lightguide 730 laminated with the reflective polarizers 712. The absorbing polarizer 772 was not used in these measurements. FIG. 7A represents light extraction form the bare top lightguide 730 (no reflective polarizers), FIG. 7B represents light extraction from the top lightguide 730 laminated with DBEF-M, and FIG. 7C represents light extraction from the top lightguide 730 laminated with DRPF. Extraction from the bare lightguide 730 occurs by total internal reflection failure. The data represented in FIGS. 7A-7C demonstrate effectiveness of light extraction from the top lightguide 730 via interactions with the laminated DBEF-M and DRPF. FIGS. 8A-E and 9A-E show results of measurements comparing polarization content of the extracted light to that of light transmitted through the reflective polarizer 712. FIG. 8 shows the data for DRPF laminated onto the top lightguide 730 and FIG. 9 shows the data for DBEF-M laminated onto the top lightguide 730. Measurements corresponding to FIGS. 8A, 8D, 9A and 9D were made without the absorbing polarizer 772, measurements corresponding to FIGS. 8B, 8E, 9B and 9E were made with the absorbing polarizer 772 aligned with the pass axis of the reflective polarizer 712, and FIGS. 8C, 8F, 9C and 9F were made with the absorbing polarizer 772 anti-aligned with the pass axis of the reflective polarizer 712. In each configuration, two measurements were made: 1) fiber source turned on and CCFL sources turned off (FIGS. 8A, 8B, 8C, 9A, 9B and 9C), and 2) fiber source turned off and CCFL sources turned on (FIGS. 8D, 8E, 8F, 9D, 9E and 9F). Overall, the data shown in FIGS. 8A-E and 9A-E demonstrate that light extracted from the top lightguide 730 is polarized predominantly with the same orientation as the light transmitted through the reflective polarizer 712.

FIGS. 10A-D show measurements performed to verify that the gain of the reflective polarizer 712 in the system 700 is not diminished because it is laminated to the top lightguide 730. First, the top lightguide was removed and the reflective polarizer was positioned at 712' in FIG. 6. Measurements were then made with a loose sheet of DBEF-M and then with the same lot of DBEF-M laminated to the top lightguide 730 (the fiber source was not turned on). The gain due to both the loose sheet and laminated DBEF-M was then computed by taking a ratio of the measurements with DBEF-M to the measurement with DBEF-M removed. The procedure was then repeated for DRPF. FIGS. 10A-D show the results of these gain measurements. As can be seen, the gain for the systems with laminated reflective polarizers was slightly higher than that for the loose sheet versions. This occurred due to the fact that an air interface had been removed and some of the diffusivity of the samples had been wetted-out against the lightguide.

Thus, the backlighting systems constructed according to the present disclosure allow achieving high output luminances and address various problems encountered with the presently known backlights for LCDs. For example, the present disclosure mitigates the risks of using variable lifetime light sources, so that burnout or aging of an individual light source would not be catastrophic to the display viewing quality. Thus, if an individual light source ages or burns out in a multiple-lightguide system according to an embodiment of the present disclosure, the effect on spatial brightness and color uniformity will be relatively insignificant due to the enhanced light mixing.

The present disclosure eliminates the need for a thick diffuser plate traditionally used in direct-lit backlights to hide individual sources from the viewer, thus providing additional gains in brightness. The present disclosure also eliminates the need for a structured reflector surface traditionally used in single-cavity direct-lit backlights, resulting in cost reduction and increased ease of manufacturing. In addition, light extracted directly from the top lightguide is likely to exit at a wide range of angles, which would enhance off-axis viewability of the display. Moreover, the present disclosure makes possible inclusion of additional features for preventing warp and physical damage to various recycling enhancement structures, which may be used in exemplary embodiments of the present disclosure.

Although the backlighting systems of the present disclosure have been described with reference to specific exemplary embodiments, those of ordinary skill in the art will readily appreciate that changes and modifications may be made thereto without departing from the spirit and scope of the present invention. For example, the number, type and configuration of light sources, lightguides, and recycling enhancement structures used in exemplary embodiments of the present disclosure may vary. Any of the lightguides used in exemplary embodiments of the present disclosure may be a hollow lightguide or have another suitable structure. See, e.g., U.S. patent application entitled "Hybrid Lightguide Backlight," Attorney Case No. 59399US002, filed concurrently herewith and incorporated by reference herein to the extent not inconsistent with the present disclosure.

In addition, it will be understood by those of ordinary skill of the art, that the terms "prismatic structures," "prismatic films" and "prisms" encompass those having structural and other variations, such as those described in U.S. Pat. No. 6,354,709, as well as prismatic structures having rounded peaks. Furthermore, although the present disclosure is particularly advantageous for use in large area, high luminance applications typically associated with LCD televisions, it could also encompass LCD monitors and point of sale devices.

What is claimed is:

1. A backlighting system, comprising:
   a first lightguide having an interior;
   at least one light source optically connected to an edge of the first lightguide for supplying light into the interior thereof;
   a first recycling enhancement structure disposed at and attached to a surface of the first lightguide;
   a second lightguide having an interior;
   a second recycling enhancement structure disposed between the first lightguide and the second lightguide;
   at least one light source optically connected to an edge of the second lightguide for supplying light into the interior thereof; and
   an extractor disposed at a surface of the second lightguide for diffuse extraction of light from the interior of the second lightguide;
   wherein at least a portion of the light supplied into the interior of the second lightguide and then diffusely extracted therefrom enters the interior of the first lightguide through a substantially optically clear surface.

2. The backlighting system as recited in claim 1, wherein the first recycling enhancement structure comprises a reflective polarizer.

3. The backlighting system as recited in claim 1, wherein the first recycling enhancement structure comprises a diffuser.

4. The backlightng system recited in claim 3, wherein the diffuser is spatially graded.

5. The backlighting system as recited in claim 1, wherein first recycling enhancement structure comprises a prismatic structure.

6. The backlighting system a recited in claim 1, wherein the second recycling enhancement structure comprises a prismatic structure.

7. The backlighting system as recited in claim 1 or 6, wherein the second recycling enhancement structure is attached to a surface of the first lightguide.

8. The backlighting system as recited in claim 1, wherein at least one of the first and the second lightguides has variable thickness.

9. The backlighting system as recited in claim 1, wherein at least one of the first and second lightguides comprises a first wedge portion and a second wedge portion.

10. A backlighting system, comprising:
    a first lightguide having an interior;
    at least one light source optically connected to an edge of the first lightguide for supplying light into the interior thereof;
    a second lightguide having an interior;
    at least one light source optically connected to an edge of the second lightguide for supplying light into the interior thereof; and
    an extractor disposed at a surface of the second lightguide for diffuse extraction of light from the interior of the second lightguide;
    wherein at least a portion of the light, supplied into the interior of the second lightguide and then diffusely extracted therefrom enters the interior of the first lightguide through a substantially optically clear surface, and wherein the first and second lightguides each comprise two opposing edges, at least one light source is optically connected to each of said edges, and the opposing edges of the first lightguide are not aligned with the opposing edges of the second lightguide.

11. A backlighting system, comprising:
    a first lightguide having an interior;
    at least one light source optically connected to an edge of the first lightguide for supplying light into the interior thereof;

a second lightguide having an interior;

at least one light source optically connected to an edge of the second lightguide for supplying light into the interior thereof; and an extractor disposed at a surface of the second lightguide for diffuse extraction of light from the interior of the second lightguide;

wherein at least a portion of the light supplied into the interior of the second lightguide and then diffusely extracted therefrom enters the interior of the first lightguide through a substantially optically clear surface, and wherein the first and second lightguides each comprise two adjacent edges, at least one light source is optically connected to each of said edges, and the adjacent edges of the first lightguide are not aligned with the adjacent edges of the second lightguide.

12. A backlighting system, comprising:

a first lightguide having an interior;

a plurality of light sources optically connected to a first edge of the first lightguide and a plurality of light sources optically connected to a second edge of the first lightguide for supplying light into the interior thereof;

a first recycling enhancement structure disposed at and attached to a surface of the first lightguide;

a second lightguide having an interior;

a second recycling enhancement structure disposed between the first lightguide and the second lightguide;

a plurality of light sources optically connected to a first edge of the second lightguide and a plurality of light sources optically connected to a second edge of the second lightguide for supplying light into the interior thereof; and an extractor disposed at a surface of the second lightguide for diffuse extraction of light from the interior thereof;

wherein at least a portion of the light supplied into the interior of the second lightguide and then diffusely extracted therefrom enters the interior of the first lightguide through a substantially optically clear surface.

13. The backlighting system as recited in claim 1 or 12, wherein the extractor is spatially graded.

14. The backlighting system as recited in claim 1, or 12, further comprising substantially optically clear surface extraction structures disposed on a surface of the first lightguide that faces the second lightguide.

15. The backlighting system as recited in claim 1, or 12, further comprising a reflector sheet disposed next to a surface of the second lightguide that faces away from the first lightguide.

16. The backlighting system as recited in claim 12, wherein the first recycling enhancement structure comprises a reflective polarizer.

17. The backlighting system as recited in claim 12, wherein the first recycling enhancement structure comprises a diffuser.

18. The backlighting system as recited in claim 17, wherein the diffuser is spatially graded.

19. The backlighting system as recited in claim 12, wherein the first recycling enhancement structure comprises a prismatic structure.

20. The backlighting system as recited in claim 12, wherein the second recycling enhancement structure comprises a prismatic structure.

21. The backlighting system as recited in claim 20, wherein the prismatic structure comprises a surface defining a plurality of prisms having apexes pointing generally away from the second lightguide.

22. The backlighting system as recited in claim 12, wherein the second recycling enhancement structure comprises two prismatic films, each prismatic film comprising grooves.

23. The backlighting system as recited in claim 22, wherein directions of the grooves of the two prismatic films are crossed.

24. The backlighting system as recited in claim 12, 20, 21, 22 or 23, wherein the second recycling enhancement structure is attached to a surface of the first lightguide.

* * * * *

UNITED STATES PATENT AND TRADEMARK OFFICE
CERTIFICATE OF CORRECTION

PATENT NO. : 7,303,322 B2  Page 1 of 1
APPLICATION NO. : 10/744569
DATED : December 4, 2007
INVENTOR(S) : David J. Lamb It is certified that error appears in the above-identified patent and that said Letters Patent is hereby corrected as shown below:

On the Title Page Item (56) Page 2,
Line 1, Above "6,566,689 B2 5/2003 Hoelen" delete "6,488,955 B1* 9/2002 Evanicky et al. 345/102".

Column 6,
Line 37, delete "135a'and" and insert -- 135a' and --, therefor.
Line 42, After "and" delete "155a'." and insert -- 155a". --, therefor.
Line 45, After "and" delete "145b'" and insert -- 145b" --, therefor.

Column 12,
Lines 41 to 61, delete "FIGS. 8A-E and 9A-E show …………………… through the reflective polarizer 712." And insert the same in Col. 12, Line 41, below DRPF." as a new paragraph.

Column 14,
Line 25, In Claim 4, delete "backlightng" and insert -- backlighting --, therefor.
Line 25, In Claim 4, after "system" insert -- as --.
Line 27, In Claim 5, after "wherein" insert -- the --.
Line 30, In Claim 6, delete "a" and insert -- as --, therefor.
Line 54, In Claim 10, delete "light," and insert -- light --, therefor.

Signed and Sealed this

Ninth Day of September, 2008

JON W. DUDAS
*Director of the United States Patent and Trademark Office*